US010392277B2

(12) United States Patent
Liu et al.

(10) Patent No.: US 10,392,277 B2
(45) Date of Patent: Aug. 27, 2019

(54) BACKWASH METHOD FOR BIOLOGICAL REACTORS

(71) Applicant: General Electric Company, Schenectady, NY (US)

(72) Inventors: Minggang Liu, Burlington (CA); Jake Goldstein, Oakville (CA); Carsten Owerdieck, Oakville (CA); Nelson Fonseca, Oakville (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 3 days.

(21) Appl. No.: 14/969,696

(22) Filed: Dec. 15, 2015

(65) Prior Publication Data

US 2016/0264437 A1   Sep. 15, 2016

Related U.S. Application Data

(60) Provisional application No. 62/131,328, filed on Mar. 11, 2015.

(51) Int. Cl.
*C02F 3/00* (2006.01)
*C02F 3/06* (2006.01)
*C02F 3/04* (2006.01)
*C02F 101/10* (2006.01)

(52) U.S. Cl.
CPC .............. *C02F 3/00* (2013.01); *C02F 3/06* (2013.01); *C02F 3/04* (2013.01); *C02F 2101/106* (2013.01); *C02F 2303/16* (2013.01); *Y02W 10/15* (2015.05)

(58) Field of Classification Search
CPC .......... C02F 2303/16; C02F 3/00; C02F 3/06; C02F 1/001; C02F 3/101; C02F 3/103; C02F 2303/14; B01D 2321/04

USPC ................................ 210/108, 618
See application file for complete search history.

(56) References Cited

U.S. PATENT DOCUMENTS

| 3,459,302 | A | * | 8/1969 | Ross .............. C02F 1/004 210/193 |
| 3,994,803 | A | | 11/1976 | Neff et al. |
| 6,183,644 | B1 | | 2/2001 | Adams et al. |
| 6,461,525 | B2 | * | 10/2002 | Ellard ............. B01D 24/002 210/797 |
| 9,802,141 | B1 | * | 10/2017 | Zwanziger ........ B01D 24/46 |
| 2009/0294356 | A1 | | 12/2009 | Beggs |
| 2012/0024798 | A1 | | 2/2012 | Pickett et al. |
| 2012/0067818 | A1 | * | 3/2012 | Westrum ............ C02F 3/06 210/615 |
| 2013/0001161 | A1 | | 1/2013 | Boner |

(Continued)

FOREIGN PATENT DOCUMENTS

WO   2007012181 A1   2/2007

OTHER PUBLICATIONS

A European Search Report and Opinion issued in connection with corresponding EP Application No. 16159155.7 dated May 17, 2016.

(Continued)

*Primary Examiner* — Claire A Norris

(57) ABSTRACT

A media bed in a biological reactor is backwashed in a plurality of short pulses. An outlet of the reactor is preferably located above, but close to, the top of the bed. During a pulse, the outlet is closed and the bed may be fluidized or otherwise expanded to above the level of the outlet. Between pulses, the bed settles to below the level of the outlet.

6 Claims, 1 Drawing Sheet

(56) References Cited

U.S. PATENT DOCUMENTS

2013/0126412 A1* 5/2013 Kaldate .................. C02F 3/286
  210/284
2013/0270181 A1 10/2013 Pickett et al.

OTHER PUBLICATIONS

European Patent Application No. 16159155.7, Communication pursuant to Article 94(3) EPC dated Feb. 19, 2018.

* cited by examiner

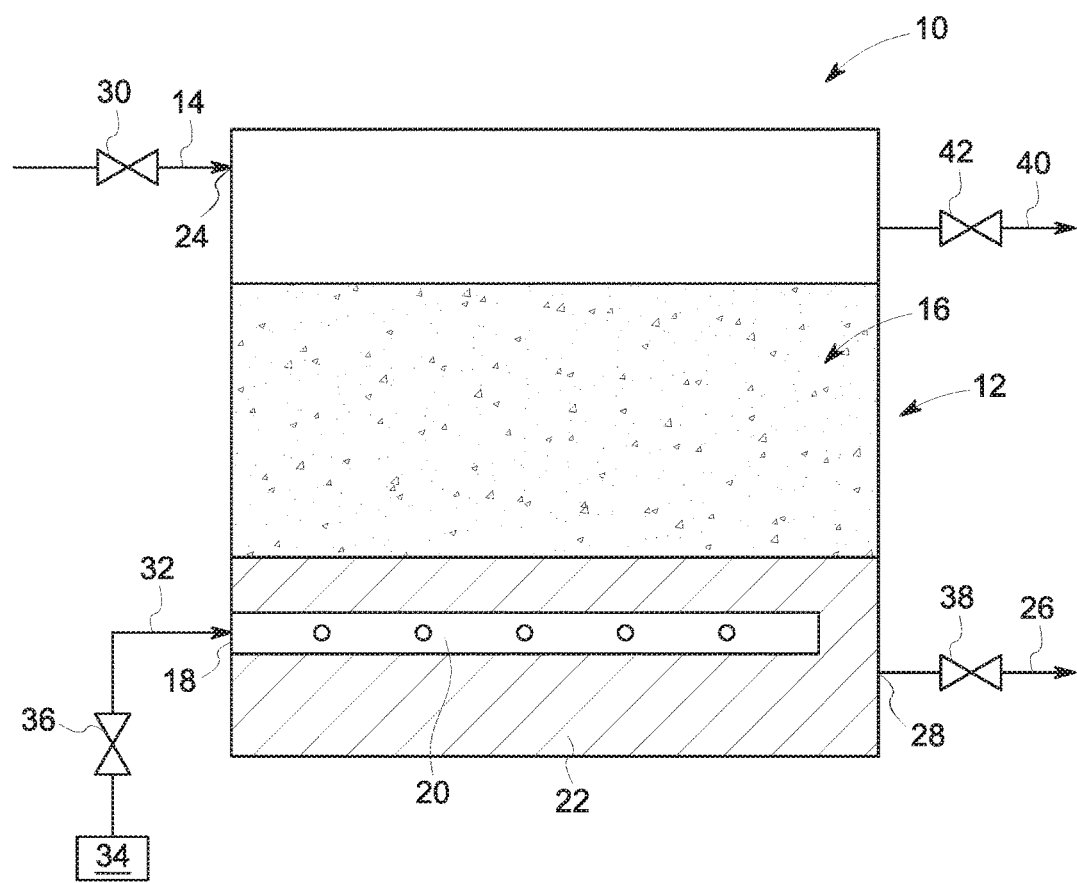

BACKWASH METHOD FOR BIOLOGICAL REACTORS

CROSS-REFERENCE TO RELATED APPLICATIONS

This application is a non-provisional application of U.S. Application Ser. No. 62/131,328, filed Mar. 11, 2015. U.S. Application Ser. No. 62/131,328 is incorporated by reference.

FIELD

This specification relates to a method for cleaning a biological reactor.

BACKGROUND

The following paragraphs are not an admission that any of the information below is common general knowledge or citable as prior art.

Selenium is an essential trace element, but becomes toxic at very low concentrations. Selenium accumulates in the bodies of plants and fish that live in selenium-contaminated water and in the bodies of wildlife and people that eat those plants and fish. In people, elevated selenium concentrations may cause neurological damage and hair and nail loss.

Selenium has been treated in biological reactors, for example as described in U.S. Pat. No. 6,183,644 and International Publication Number WO 2007/012181, and as used in ABMet™ reactors sold by the GE Water and Process Technologies. In such reactors, dissolved selenium is removed from contaminated water by treating the water in a reactor containing selected endemic and other selenium reducing organisms. Microbes may be isolated from the specific water or imported from other selenium contaminated water. The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water. The entirety of U.S. Pat. No. 6,183,644 is incorporated herein by this reference to it.

The high density biofilm may be supported on a media bed, as described in US Publication No. 2013/0270181. Activated carbon may be employed as the medium and provides a large surface area available for microbial growth. The activated carbon may be in the form of granular activated carbon (GAC) or pelletized activated carbon. Other media may be used, for example polymeric fibers, crushed stone, pumice, sand, plastic media or gravel. As selenium, and possibly other solids, accumulate in the media bed, the pressure drop across the media bed will increase. As a selected time interval or pressure drop set point, the media bed is backwashed to remove the grown biomass and solids retained in the media bed. The upflow velocity during backwashing may be about 80 ft/hr. Backwashing may be required from between once every two weeks to only a few times each year, for example once a month. Backwashing may take, for example, 30 minutes. The upflow velocity applied during flushing may result in an upward expansion of the media bed by up to 30%. The backwash liquid and entrained solids are removed through troughs located above the expected media expansion area and connected to backwash effluent line. The entirety of US Publication No. 2013/0270181 is incorporated herein by this reference to it.

SUMMARY

The following summary is intended to introduce the reader to this specification but not define any invention. Inventions may reside in the combination of one or more of the apparatus elements or process steps described anywhere in this document.

The backwashing method described above necessitates a large space to be reserved above the media bed to accommodate media expansion and settling without the media outflowing with the backwash liquid through the overflow troughs. In addition, the method described above creates stable laminar flow of backwash liquid through the media bed, which undermines backwash efficiency in removing the impurities and solids retained in the media bed. Further, solids retained below the overflow troughs are not discharged.

This specification describes a method of backwashing a media bed in a biological reactor. The bed is backwashed in a plurality of short pulses. An outlet of the reactor is preferably located above, but close to, the top of the bed. During a pulse, the outlet is closed and the bed may be fluidized or otherwise expanded to above the level of the outlet. Between pulses, the bed settles to below the level of the outlet.

Without intending to be limited by theory, the inventors believe that the pulses generate more turbulence to remove solids, for example elemental selenium, from the bed relative to a continuous backwash of the same total duration and flow rate. Relative to the prior art reactor described above, replacing the overflow troughs with a relatively low outlet allows more of the backwashed solids to be released, or conserves space in the bioreactor, or both.

BRIEF DESCRIPTION OF THE FIGURES

FIG. 1 is a schematic cross-sectional view of a biological reactor.

DETAILED DESCRIPTION

FIG. 1 shows a treatment system 10 including a biological reactor 12. Biological reactor 12 can be adapted to remove various impurities from wastewater influent 14, For example, biological reactor 12 can be adapted to remove selenium. Reactor 12 may be operated as an attached film, upwards or downwards plug flow reactor.

In the biological reactor 12 shown, media bed 16 provides a location on which a population of microorganisms will grow and be retained within the biological reactor 12. Activated carbon may be employed as the medium and provides a large surface area available for microbial growth. The activated carbon may be in the form of granular activated carbon (GAO) or pelletized activated carbon. Other media might be used, for example polymeric fibers, crushed stone, pumice, sand, plastic media or gravel.

The biological reactor 12 has a backwash port 18, which may be connected to a distribution system 20, for example one or more perforated horizontal pipes. In the preferred embodiment, the backwash port 18 and the distribution system 20 are positioned below the media bed 16. Aggregate 22 may be installed around the distribution systems 20 below the media bed 16 to aid in flow distribution while also preventing breakthrough of media to the distribution systems 20. This arrangement is preferred but other systems and arrangements may be suitable for distributing backwashing liquid through media bed 16.

During normal operation, wastewater influent 14 enters biological reactor 12 through upper port 24 and flows downwards through media bed 16. Treated effluent 26 exits the reaction vessel through lower port 28. While passing through the media bed 16, impurities are biologically removed from the wastewater and are retained within the media bed 16. For example, soluble forms of selenium may be reduced to elemental selenium located inside or outside of the microorganisms. As solids (including living and dead microorganisms) accumulate in the media bed 16, the pressure drop across the media bed 16 will increase deteriorating filter efficiency.

At a selected time interval or pressure drop set point, the flow of wastewater influent 14 is stopped by closing the influent valve 30. The wastewater influent 14 in the biological reactor 12 is preferably allowed to pass through the media bed 16 and drain through lower port 28. The wastewater influent 14 in the reactor 12 may alternatively be allowed to drain to a selected minimum level, which may be above, at or below the top of the media bed 16. Effluent valve 38 is then closed and a backwash cycle may be initiated.

At the start of the backwash cycle, a pulse of backwash liquid 32 is supplied from backwash supply 34 by opening backwash influent valve 36 and, optionally, by operating a pump if necessary. The backwash liquid 32 is supplied through the backwash port 18 to flush or backwash the media bed 16, The backwash liquid 32 may be supplied, for example, at the rate of 5-20, preferably about 10, gpm/ft$^2$. As the backwash liquid 32 travels through the media bed 16, solids are removed from the media bed 16 and entrained in the backwash liquid 32.

The pulse may continue, for example, for less than 5 minutes, preferably 2 to 4 minutes. The turbulence created by the passage of backwash liquid 32 may expand the media bed 16 beyond its volume during normal operation. At the end of pulse, the supply of backwash liquid 32 is stopped.

The media bed 16 is then allowed to at least partially settle. Preferably, the media bed 16 settles to at least below the level of an opening in the reactor 12 to a backwash effluent line 40. At the end of the settling period, backwash liquid 32 containing entrained solids is drained from the biological reactor 12 through the backwash effluent line 40 by opening a backwash effluent valve 42. After the water level in the reactor 12 is near or at the opening from the reactor 12 to the backwash effluent line 40, the backwash effluent valve 42 is closed.

The pulse and drain steps described above may be repeated one or more times. For example, the steps may be repeated two to five times. The reactor 12 is then returned to normal operation.

The method described above provides a means of effectively cleaning the media bed by providing a dynamic and unstable backwash flow to produce shear on the media. This is in contrast to backwashing with a continuous flow for 15 minutes or more, which creates a laminar flow and generates less turbulence on the media due to a stabilized flow pattern. To allow for more complete draining of solids released during a pulse, the opening from the reactor 12 to the backwash effluent line 40 is located above, but near, the height of the media bed 16 when fully settled. For example the opening from the reactor 12 to the backwash effluent line 40 may be located less than 30 cm above or less than 15 cm above, the height of the media bed 16 when fully settled.

The process described above is intended to provide an example and not to limit or define any claimed invention. Other cleaning processes may be used within the scope of an invention defined in one of the following claims.

We claim:

1. A method for cleaning a biological reactor having a media bed and an outlet located above the top of the media in the media bed while the media bed is fully settled, said method comprising:
   a. stopping supply of a wastewater influent to be treated;
   b. supplying a backwash liquid to pass through said media bed such that said media bed is expanded above the outlet while said outlet is closed;
   c. stopping supply of said backwash liquid;
   d. allowing said media bed to at least partially settle below said outlet; and
   e. after step d., draining backwash liquid from above the media bed through said outlet.

2. The method as defined in claim 1 wherein substantially all said wastewater influent is drained from said biological reactor following step (a) but before step (b).

3. The method as defined in claim 1 wherein said backwash liquid is supplied at a rate approximately equal to 5-20 gpm/ft$^2$.

4. The method as defined in claim 1 wherein in step (b) said backwash liquid is supplied for 5 minutes or less.

5. The method as defined in claim 1 wherein steps b) to e) are repeated at least once after step (a) and before resuming the supply of the wastewater influent to be treated.

6. The method as defined in claim 1 further comprising:
   after step a., allowing the wastewater influent in the biological reactor to pass through the media bed and drain, wherein said wastewater influent is not drained through said outlet.

* * * * *